United States Patent [19]

Harada et al.

[11] Patent Number: 5,090,338

[45] Date of Patent: Feb. 25, 1992

[54] APPARATUS AND PROCESS FOR TREATING WASTE INCINERATION FLYASH

[75] Inventors: Yasuaki Harada, Kasukabe; Gentaro Takasuka, Yokohama; Tatuo Kato; Yoshimichi Hanai, both of Chigasaki; Hiroshi Kamei; Kazuya Yamada, both of Yokohama; Hiroshi Otake, Hasuda; Mazumi Itaya, Ichihara, all of Japan

[73] Assignee: Mitsui Engineering & Shipbuilding Co., Ltd., Tokyo, Japan

[21] Appl. No.: 616,596

[22] Filed: Nov. 21, 1990

[30] Foreign Application Priority Data

Mar. 26, 1990 [JP] Japan ............................. 2-75857

[51] Int. Cl.⁵ .................................................. F23J 1/00
[52] U.S. Cl. ................................. 110/165 A; 110/110; 110/259
[58] Field of Search ............... 110/165 R, 165 A, 259, 110/110

[56] References Cited

U.S. PATENT DOCUMENTS 2,626,856  7/1948  Alles .
4,267,801  5/1981  Robinson ............... 110/165 R X
4,628,828  12/1986  Holtham et al. ............ 110/165 R

FOREIGN PATENT DOCUMENTS 280364  8/1988  European Pat. Off. .
295083  11/1916  Fed. Rep. of Germany ... 110/165 A
3623492  1/1988  Fed. Rep. of Germany .

Primary Examiner—Edward G. Favors
Attorney, Agent, or Firm—Fay, Sharpe, Beall, Fagan, Minnich & McKee

[57] ABSTRACT

Incineration flyash is treated by reducing the organic chlorine compounds contained in the flyash. A cylindrical body equipped with a rotating shaft having a screw conveyor and agitating blades for conveying and agitating the flyash is filled to at least a 75 vol % charge so that contact of the flyash with oxygen is made as small as possible. The flyash is subjected to agitation and heat-treatment at 300° C. or higher. The cylindrical body has a feeding port for the waste incineration flyash and a discharging port for the discharge of the treated flyash. The screw conveyor is at the introducing part and has a pitch that is successively reduced toward the agitating part for charging the flyash in the agitating part at a greater vol. % than that which occurs in the introducing part.

4 Claims, 2 Drawing Sheets 005,090,338

APPARATUS AND PROCESS FOR TREATING WASTE INCINERATION FLYASH

BACKGROUND OF THE INVENTION

1. Field of the Invention

This invention relates to a process for treating waste incineration flyash and an apparatus therefor. More particularly, it relates to an apparatus and process for treating waste incineration flyash, for reducing particularly toxic organic chlorine compounds contained in waste incineration flyash (hereinafter referred to as flyash) formed at the time of incinerating municipal, commercial, or industrial waste.

2. Description of the Related Art

It has been known that organic chlorine compounds are harmful to human bodies, particularly aromatic chlorine compounds such as highly poisonous aromatic chlorine compounds e.g. PCDD (polychlorinated dibenzo-p-dioxine), PCDF (polychlorinated dibenzofuran), etc. that are formed as by-products of pesticides or secondary-formed substances of waste incineration and that contaminate the environment (K. Olie et al, Chemosphere, 6, 455 (1977), and T. Wakimoto et al, Environmental Health Perspectives, 59, 159 (1985)).

FIG. 4 shows a flow chart of a conventional and typical waste incineration plant. This plant is composed mainly of an incinerator 31 and a gas cooling tower 32, a precipitator 33 and a chimney 34, successively connected to the incinerator. Wastes are subjected to incineration in the incinerator 31 at about 750° to 900° C., and the resulting exhaust gas is cooled down to about 300° C. at the cooling tower 32, introduced into the precipitator 33, and separated into flyash and gas, the flyash being discharged from a flyash-discharging port 33A and the gas being discharged from the chimney 34 to the outside of the system.

However, the above-mentioned process is directed only to removal of solids (mainly, flyash) in exhaust gas discharged from the incinerator, but the removal of toxic organic chlorine compounds, particularly aromatic chlorine compounds, has not yet been taken into consideration.

The present inventors have proposed various proposals for reducing organic chlorine compounds discharged from waste incineration plants.

Firstly, in the previous patent application (Japanese patent application No. Sho 62-70936), the applicants elucidated a generation process of aromatic chlorine compounds and disclosed a process for preventing the occurrence of the same. This process was sufficiently effective for inhibiting the occurrence of organic chlorine compounds, but the processing of once generated chlorine compounds has still not been taken into consideration.

In Japanese patent application laid-open No. Hei 1-155937, the applicants proposed a process for removing aromatic chlorine compounds contained in exhaust gas generated from waste incinerators. According to this technique, aromatic chlorine compounds contained in exhaust gas are notably reduced, but organic chlorine compounds separated from exhaust gas and contained in flyash have not been removed.

Thus, there is a fear that organic chlorine compounds such as the above PCDD, PCDF, etc. are included in flyash discharged from an electric precipitator (EP) and other dust-removing means equipped in the waste incineration apparatus. Further, when the flyash is dumped in landfills for example, there is a danger that the organic chlorine compounds return via leachate and the like to animals, plants or human bodies to have a bad effect upon them.

Thus, in Japanese patent application No. Sho 63-147193, the applicants proposed a technique of reducing toxic organic chlorine compounds, particularly aromatic chlorine compounds, contained in flyash, but it is still insufficient.

SUMMARY OF THE INVENTION

A first object of the present invention is to provide a process for treating flyash, capable of far reducing the organic chlorine compounds contained in the flyash.

A second object of the present invention is to provide an apparatus for treating the flyash, capable of carrying out the above process with certainty and by means of a simple system.

The process for treating flyash of the present invention consists in that the flyash recovered from the waste incineration plant is charged in a treatment apparatus where the flyash is subjected to heat treatment at 300° C. or higher in a state where contact of the flyash with oxygen is made as small as possible.

Further, the apparatus for treating flyash of the present invention comprises:

a cylindrical body of the apparatus having a feeding port for flyash and a discharging port for the resulting treated material spaced from each other in the axial direction of the body;

a rotating shaft supported within the body and provided with a flyash-introducing part composed of a screw conveyor, and an agitating part for the flyash composed of stirring blades, the introducing part of the rotating shaft being arranged on the side of the feeding port, the agitating part being arranged on the side of the discharging port, and the pitch of the screw conveyor of the introducing part being successively reduced toward the agitating part; and a heating means capable of heating the flyash to 300° C. or higher for heating at at least one of the body of the apparatus and the rotating shaft.

DETAILED DESCRIPTION OF PREFERRED EMBODIMENTS

Figure 1:
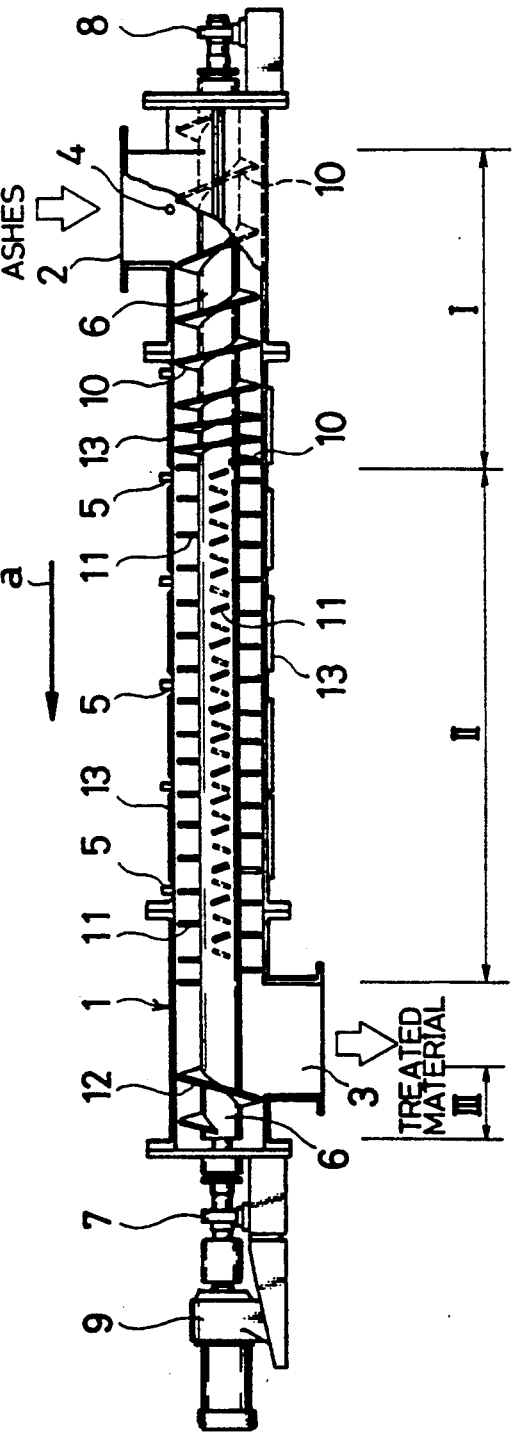
FIG. 1 shows a longitudinally cross-sectional front view illustrating an apparatus for carrying out the process for treating the flyash, of the present invention.

According to the process of the present invention, the flyash is charged in the treatment apparatus and subjected to heat treatment in a state such that contact of the flyash with oxygen is made as small as possible.

As a result of experiments, under conditions of a quantity of flyash treated, of 150 kg/hr and a treating time of 15 min., (1) it was possible in the case of a charging extent of 75 vol.% to treat and reduce most of the toxic organic chlorine compounds down to a negligibly small quantity at a treating temperature of 500° C. (see Table 1), and (2) it was possible in the case of a charging extent of 98 vol.% to treat and reduce most of the toxic organic chlorine compounds down to a negligibly small quantity at a treating temperature of 400° C. (see Table 2).

As apparent from the experimental results, when heat treatment is carried out in a state where the flyash fills the heat treatment apparatus so that contact of the flyash with oxygen is made as small as possible, it is possible to subject most of the organic chlorine compounds to heat-decomposition, thereby far reducing the content of the organic chlorine compounds in the resulting material.

In the present invention, the filling extent in the apparatus is defined as a percentage by volume of a filled space with the flyash in the apparatus to an original space in the apparatus, when the space in the apparatus is filled with the flyash. The filling of charging extent in the present invention is 75 vol.% or more. Practically it is determined by detecting a static level of flyash in the apparatus, especially at the agitating part thereof, that is by detecting whether or not the static level of the flyash reaches one corresponding to 75 vol.% or more of the space in the apparatus. In order to detect the level of the flyash charged in the apparatus, a level gauge or a window can be provided.

According to the experimental data, the load of a rotation-driving source which rotates the shaft varies with the filling extent. So it is also possible to control the filling or charging extent by detecting the load of the rotation-driving source, for example, electric current of a motor, and vary the rotation number of the rotating shaft according to the load of the rotation driving source.

Next, according to the apparatus of the present invention, the flyash to be treated is fed into the introducing part through the feeding port provided on the body of the apparatus and the rotating shaft is rotated. Accompanying the rotation of the rotating shaft, the flyash in the cylindrical body advances from the introducing part composed of the screw conveyor provided on the rotating shaft toward the agitating part provided along the rotating shaft. Here, since the pitch of the screw at the introducing part is successively reduced toward the agitating part, the flyash is gradually packed in the agitating part, the resulting flyash filling the agitating part within the body of the apparatus so that contact of the flyash with oxygen or air is cut off. In such a state, while the flyash is agitated by stirring blades at the agitating part, it is heated to 300° C. or higher and heat-treated. As described above, when the contact of the flyash with oxygen is made as small as possible by cutting off the oxygen and the flyash is subjected to heat treatment, it is possible to far reduce the content of toxic organic chlorine compounds in the flyash, as understood also from the above experimental results.

The treated material is discharged from the end of the agitating part through the discharging port to the outside of the apparatus.

The apparatus of the present invention is constructed such that the pitch of the screw conveyor part provided around the rotating shaft is successively reduced toward the agitating part to charge the agitating part of the apparatus with the flyash; hence it is possible to decompose toxic organic chlorine compounds in the flyash in the apparatus effectively by a simple heat-treatment.

Examples of the present invention will be described in detail referring to the accompanying drawings.

FIG. 1 shows a longitudinally cross-sectional front view illustrating an apparatus for carrying out a process for treating flyash, of the present invention.

Figure 2:
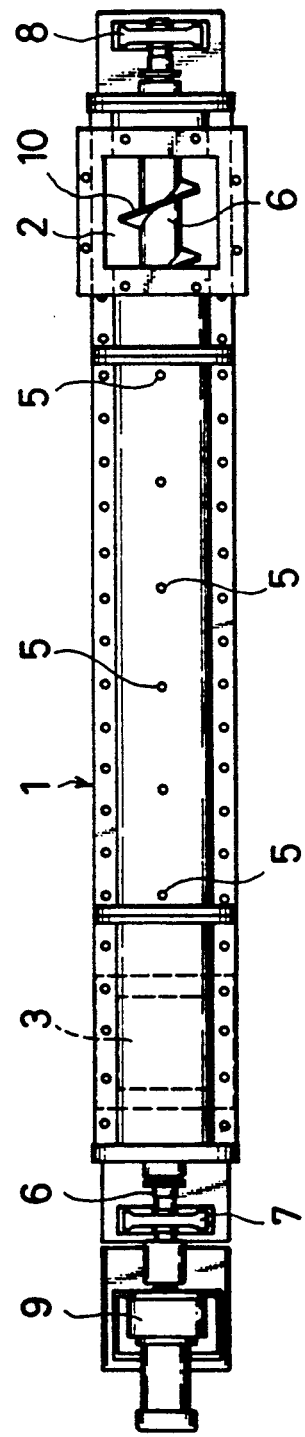
FIG. 2 shows a plan view of the same.

FIG. 2 shows a plan view of the apparatus of FIG. 1.

Figure 3:
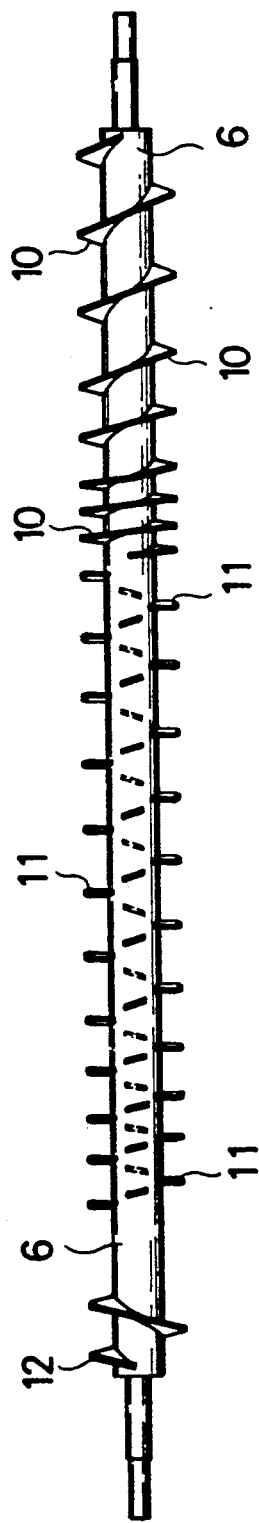
FIG. 3 shows a front view illustrating a taken-out assembly of a rotating shaft and the respective parts provided thereonto.
Figure 4:
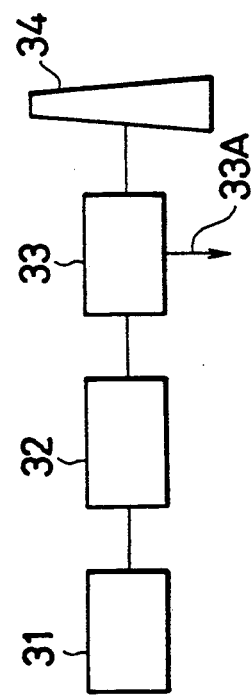
FIG. 4 shows a flow chart of a conventional and typical incineration plant.

FIG. 3 shows a front view illustrating a rotating shaft in FIG. 1 and the respective parts provided thereon.

The apparatus shown in these figures is composed of a body of the apparatus 1, a rotating shaft 6, an introducing part I, an agitating part II and a discharging part III provided along the shaft, and band heater 13 as a heating means.

The body of the apparatus 1 is formed by an elongated, cylindrical body and installed in a lateral form in the horizontal direction, as shown in FIGS. 1 and 2. A feeding port 2 for flyash to be fed is provided at one end part of the body of the apparatus 1, and spaced therefrom, a discharging port 3 for the resulting material to be discharged is provided on the other end part. Further, the body of the apparatus 1 is provided with a sight window 4 at the position of the feeding port 2, and ports 5 for detecting pressure and temperature inside the body are provided spaced from each other between the feeding port 2 and the discharging port 3. Into the feeding port 2 is fed flyash collected from the precipitator, attached to the waste incineration plant.

The rotating shaft 6 is arranged on the same axis as that of the body of the apparatus 1 and supported by bearings 7 and 8 installed outside the body of the apparatus 1, as shown in FIGS. 1 and 2. Further, the rotating shaft 6 is connected to a rotation-driving source 9.

The rotation-driving source 9 may be provided with a speed controller (not shown) and this speed controller may be connected to a pressure gauge (not shown) attached to the detection port 5 provided in the body of the apparatus 1, thereby controlling the rotation number of the rotating shaft 6 or the rotation-driving source 9 in accordance with the inside pressure of the body of the apparatus 1 or the load placed on the rotation driving source 9.

The feeding part I for the flyash is formed by the screw 10 fixed to the rotating shaft 6. This 10 is provided with a variable pitch that is successively reduced toward the agitating part II. Further, the initial end of the introducing part I is positioned at the feeding port 2 of the apparatus 1, and this introducing part I is formed so as to carry the flyash fed through the feeding port 2, toward the agitating part II by means of the screws 10, and charge the flyash into the agitating part II, thereby packing the agitating part II with the flyash.

The agitating part II for the flyash is provided with the rotating shaft having stirring blades 11 fixed thereonto. The stirring blades are arranged at an equal pitches on the spiral locus. The final end of the agitating part II is positioned at the discharging port 3 provided in the apparatus 1, and while the flyash carried by the feeding part I is agitated by stirring blades 11, it is transferred toward the discharging port 3. The moving direction of the flyash is indicated by an arrow marked "a" in FIG. 1.

The discharging part III for the treated material is composed of a screw 12 fixed onto the rotating shaft 6. This screw 12 are provided in the reverse direction to that of screw 10 of the feeding part I. Further, the discharging part III is constructed so that the treated material that overruns the discharging port 2 may be pushed back toward the discharging port 2.

The above band heater 13 as a heating means is attached onto the outer peripheral surface of the body of the apparatus 1, from the vicinity of the terminal end of the feeding part I for the flyash to the vicinity of the terminal end of the agitating part II, as shown in FIG. 1. The band heater is omitted to be drawn in FIG. 2. The band heater 13 may be replaced by any other heating means like one utilizing a high temperature gas or liquid, or an induction heating means. A rotating shaft having a hollow body in which heating medium such as steam is passed through or an electric heater is provided may be used as a heating means.

When the process of the present invention is carried out using the above apparatus, the flyash collected by a precipitator, for example, is fed into the body of the apparatus 1 through the feeding port 2 provided in the apparatus 1, and the rotation-driving source 9 is driven to rotate the rotating shaft 6. The flyash is carried within the body of the apparatus 1 which is heated by band heater B toward the agitating part II by means of a screw 10 at the feeding part I provided along the rotating shaft 6. Since the screw 10 at the feeding part I is successively reduced in the pitch toward the agitating part II, the flyash is gradually packed in the agitating part II to thereby minimize the contact of the flyash with air or oxygen being.

In such a state, while the flyash is agitated by the stirring blades at the agitating part II, it is heated to 300° C. or higher by means of the band heater 13 to decompose organic chlorine compounds in the flyash.

Thus, when the flyash is subjected to heat treatment in a state where contact of the flyash with oxygen is made as small as possible, it is possible to reduce the content of the organic chlorine compounds in the resulting treated material effectively.

Experimental results of heat treatment using the apparatus of FIG. 1, carried out under conditions of the quantity of the flyash treated: 150 kg, the treating time: 15 minutes and the filling or charging extent: 75 vol.% are shown in Table 1.

Further, experimental results of heat treatment carried out under conditions of the quantity of the flyash treated: 150 kg, the treating time: 15 min. and filling extent of 98 vol.% are shown in Table 2.

TABLE 1

| Organic chlorine compounds | Non-treatment | 300° C. | 400° C. | 500° C. | Unit: kg/g-ashes detection limit value |
|---|---|---|---|---|---|
| PCDD | | | | | |
| 1CDD | nd | nd | nd | nd | nd < 0.5 |
| 2CDD | nd | 1.4 | nd | nd | nd < 0.5 |
| 3CDD | nd | 6.1 | nd | nd | nd < 0.5 |
| 4CDD | 3.0 | 48 | 86 | nd | nd < 0.5 |
| 5CDD | 4.2 | 52 | 79 | nd | nd < 0.5 |
| 6CDD | 10.0 | 16 | 120 | nd | nd < 1.0 |
| 7CDD | 112 | 120 | 240 | nd | nd < 1.0 |
| 8CDD | 256 | 240 | 320 | nd | nd < 1.0 |
| PCDF | | | | | |
| 1CDF | nd | 18 | 24 | nd | nd < 2.0 |
| 2CDF | nd | 10 | nd | nd | nd < 2.0 |
| 3CDF | nd | 43 | 156 | nd | nd < 2.0 |
| 4CDF | 16 | 200 | 410 | nd | nd < 1.0 |
| 5CDF | 116 | 580 | 390 | nd | nd < 3.0 |
| 6CDF | 320 | 360 | 520 | nd | nd < 2.0 |
| 7CDF | 1280 | 980 | 1900 | nd | nd < 2.0 |
| 8CDF | 510 | 490 | 1200 | nd | nd < 2.0 |
| Chlorinated benzenes | | | | | |
| Trichloro-benzene | 18 | 210 | 240 | nd | nd < 0.2 |
| Tetrachloro-benzene | 34 | 1800 | 1300 | nd | nd < 0.2 |
| Pentachloro-benzene | 180 | 490 | 420 | nd | nd < 0.2 |
| Hexachloro-benzene | 135 | 180 | 240 | nd | nd < 0.2 |
| Polycyclic aromatics | | | | | |
| Anthracene | 180 | 110 | 140 | 210 | nd < 1.0 |
| Fluoranthene | 130 | 125 | 110 | 125 | nd < 2.0 |
| Pyrene | 64 | 70 | 52 | 48 | nd < 2.0 |
| Dibenzofuran | 29 | 11 | 118 | 200 | nd < 1.0 |

Note: unit: ng/g-ashes, nd: not detected. PCDD: polychlorinated dibenzo-p-dioxin, 1CDD: monochloro-p-dibenzodioxine, 2CDD: dichlorodibenzo-p-dioxine, PCDF: polychlorinated dibenzofuran, 1CDF: monochlorodibenzofuran, 2CDF: dichloro-p-dibenzofuran.

TABLE 2

| Organic chlorine compounds | Non-treatment | 300° C. | 400° C. | 500° C. | Unit: kg/g-ashes detection limit value |
|---|---|---|---|---|---|
| PCDD | | | | | |
| 1CDD | nd | 4.0 | nd | nd | nd < 0.5 |
| 2CDD | nd | 1.8 | nd | nd | nd < 0.5 |
| 3CDD | nd | 5.5 | nd | nd | nd < 0.5 |
| 4CDD | 5.5 | 97 | nd | nd | nd < 0.5 |
| 5CDD | 2.0 | 53 | nd | nd | nd < 0.5 |
| 6CDD | 18 | 45 | nd | nd | nd < 1.0 |
| 7CDD | 120 | 30 | nd | nd | nd < 1.0 |
| 8CDD | 234 | 44 | nd | nd | nd < 1.0 |
| PCDF | | | | | |
| 1CDF | nd | 12 | nd | nd | nd < 2.0 |
| 2CDF | nd | 70 | nd | nd | nd < 2.0 |
| 3CDF | nd | 138 | nd | nd | nd < 2.0 |
| 4CDF | 28 | 796 | nd | nd | nd < 1.0 |
| 5CDF | 152 | 540 | nd | nd | nd < 3.0 |
| 6CDF | 390 | 270 | nd | nd | nd < 2.0 |
| 7CDF | 1040 | 243 | nd | nd | nd < 2.0 |
| 8CDF | 970 | 150 | nd | nd | nd < 2.0 |
| Chlorinated benzenes | | | | | |
| Trichloro-benzene | 15 | 210 | nd | nd | nd < 0.2 |
| Tetrachloro-benzene | 48 | 1150 | nd | nd | nd < 0.2 |
| Prntachloro-benzene | 120 | 190 | nd | nd | nd < 0.2 |
| Hexachloro-benzene | 142 | 51 | nd | nd | nd < 0.2 |
| Polycyclic aromatics | | | | | |
| Anthracene | 220 | 140 | 230 | 300 | nd < 1.0 |
| Fluoranthene | 140 | 94 | 138 | 125 | nd < 2.0 |
| Pyrene | 53 | 38 | 98 | 110 | nd < 2.0 |
| Dibenzofuran | 12 | 3.6 | 230 | 270 | nd < 1.0 |

As apparent from Table 1, when the heat-treatment is carried out with a charge of 75 vol.% and a heating temperature of 500° C. or higher, most of the toxic organic chlorine compounds are heat-decomposed and toxic organic compounds do not remain in the treated material. Further, as apparent from Table 2, when the heat-treatment is carried out with a charge of 98 vol.% and a heating temperature of 400° C. or higher, most of toxic organic compounds do not remain in the treated material.

Whereas, even when heat-treatment is carried out under the conditions of filling lower than 75 vol.% and of heating lower than 400° C., toxic organic chlorine compounds are not decomposed adequately and to the contrary, a tendency that the content of harmful organic chlorine compounds in the treated material increased was seen.

As described above, the flyash is filled in the agitating part II in the apparatus 1 and agitated in a state where contact of the flyash with oxygen is made as small as possible, and the treated material subjected to the heat-treatment is sent from the agitating part II to the discharging port 3. The treated material having overrun the discharging port 3 is optionally pushed back to the discharging port 3 by the discharging part III composed of the screw 12 provided on the rotating shaft 6.

By continuously feeding the flyash to the apparatus 1 and repeating the above steps, it is possible to continuously treat the flyash.

In addition, if an amount of the flyash fed into the apparatus 1 is unbalanced with the treating capacity of the apparatus, the rotation number of the rotating shaft 6 or the rotation-driving source 9 may be controlled by detecting the inside pressure taken out of the detection port 5 or the load of the rotation-driving source 9 as parameters to control the rotation number of the rotating shaft 6. In this case, it is necessary to keep the filling extent of the flyash in the agitating part II to be 75 vol.% or more. It is detected by a level meter provided at the agitating part II, for example, that the agitating part is filled with the flyash so that almost no free space at the upper part thereof remains for example.

Further, the heating means is not limited only to the band heaters 13 shown in the figure, but for example a high temperature fluid may be introduced into the inside of the rotating shaft 6 to transmit the heat from the rotating shaft 6 to the flyash during the treatment. Thus, the heating means may be of any type which can heat the flyash 300° C. or higher during the treatment.

Although the process of the present invention is preferably carried out using the apparatus shown in FIG. 1, alternatively it may be carried out by using a vessel provided with a heater and a stirrer or rotor, if the conditions of temperature at 300° C. or more, preferably 400° C. or more, and the filling or charging extent of 75 vol.% or more are satisfied. This apparatus or vessel may be one provided as part of a precipitator of an incineration plant, or provided independently.

According to the process of the present invention, when the flyash recovered from the waste incineration plant is charged in the treatment apparatus and is subjected to heat-treatment at 300° C or higher in a state where the contact of the flyash with oxygen is made as small as possible, then it is possible to subject most of toxic organic chlorine compounds in the flyash to heat-decomposition; hence the process is effective for reducing organic chlorine compounds contained in the flyash.

Further, according to the apparatus of the present invention, the flyash is carried along the rotating shaft by the introducing part composed of the screw conveyor and packed therein to fill the part with the flyash, and the flyash is sent to the agitating part and agitated by means of stirring blades provided thereon, and subjected to heat treatment at 300° C. or higher by means of a heating means; thus the above process can be carried out effectively.

What we claim is:

1. An apparatus for treating waste incineration flyash, comprising:

a cylindrical body extending in an axial direction having a feeding port for introducing waste incineration flyash in the body and a discharging port for discharging flyash contained in the body, said feeding port and discharging port being spaced from each other in the axial direction;

a rotating shaft supported within the body having an introducing screw conveyor portion adjacent said feeding port for receiving flyash through said feeding port and an agitating portion downstream of said introducing screw conveyor portion receiving flyash from said screw conveyor portion and having stirring blades for agitating and further conveying flyash through said body to the feeding port;

said introducing screw conveyor portion of said rotating shaft having a pitch that is successively reduced in the axial direction extending toward said agitating portion; and at least one of said body and said rotating shaft having means for heating said flyash contained in said body to at least 300° C.

2. An apparatus for treating waste incineration flyash according to claim 1, wherein said rotating shaft further has a discharging screw conveyor portion opposite said agitating portion with respect to said discharging port in the axial direction of the body, said discharging screw conveyor being reversely threaded with respect to said introducing screw conveyor so that flyash conveyed by said agitating portion beyond the discharging port is conveyed back toward the discharging port by said discharging screw conveyor portion.

3. An apparatus for treating waste and incineration flyash according to claim 1, wherein said agitating portion of said rotating shaft comprises stirring blades fixed on said rotating shaft, and wherein said stirring blades are arranged in a spiral configuration, each fixed on said rotating shaft, to both agitate and convey flyash in said body.

4. An apparatus for treating waste incineration flyash, comprising:

a cylindrical body extending in an axial direction having a feeding port for introducing waste incineration flyash in the body at a flyash introducing portion, an agitating portion that receives flyash from said introducing portion, and a discharging port that receives flyash from said agitating portion for discharging flyash contained in the body, said feeding port and discharging port being spaced from each other in the axial direction;

screw conveyor means in said body having a first part disposed in said introducing portion of said body for conveying flyash at a first vol. % and a second part having a reduced pitch with respect to said first part of conveying and charging flyash into said agitating portion at a second vol. % greater than said first vol. % to achieve at least a 75 vol. % charge of flyash in said agitating portion;

said screw conveyor means having an axially extended shaft portion having agitating blades fixed thereon in said agitating portion, said agitating blades being arranged in a spiral configuration for agitating and conveying flyash to said discharge port; and means for heating flyash inn said agitating portion to at least 300° C.

* * * * *

UNITED STATES PATENT AND TRADEMARK OFFICE
CERTIFICATE OF CORRECTION

PATENT NO.  : 5,090,338
DATED       : February 25, 1992
INVENTOR(S) : HARADA et al It is certified that error appears in the above-identified patent and that said Letters Patent is hereby corrected as shown below:

Column 5, Table 1, between lines 45-50, change "kg/g-ashes" to --ng/g-ashes--.

Column 6, Table 1-continued, between lines 1-5, change "kg/g-ashes" to --ng/g-ashes--.

Column 6, Table 2, between lines 20-25, change "kg/g-ashes" to --ng/g-ashes--.

Signed and Sealed this

Seventh Day of December, 1993

*Attest:*

BRUCE LEHMAN

*Attesting Officer*   Commissioner of Patents and Trademarks